(12) United States Patent
Mayer

(10) Patent No.: US 11,978,262 B2
(45) Date of Patent: May 7, 2024

(54) IMAGE CLASSIFICATION AND ASSOCIATED TRAINING FOR SAFETY-RELEVANT CLASSIFICATION TASKS

(71) Applicant: Robert Bosch GmbH, Stuttgart (DE)

(72) Inventor: Udo Mayer, Ludwigsburg (DE)

(73) Assignee: ROBERT BOSCH GMBH, Stuttgart (DE)

( * ) Notice: Subject to any disclaimer, the term of this patent is extended or adjusted under 35 U.S.C. 154(b) by 334 days.

(21) Appl. No.: 17/357,071

(22) Filed: Jun. 24, 2021

(65) Prior Publication Data

US 2021/0406587 A1 Dec. 30, 2021

(30) Foreign Application Priority Data

Jun. 29, 2020 (DE) .......................... 102020208008.9

(51) Int. Cl.

| | |
|---|---|
| *G06V 20/00* | (2022.01) |
| *B60Q 9/00* | (2006.01) |
| *G06F 18/21* | (2023.01) |
| *G06F 18/214* | (2023.01) |
| *G06F 18/2413* | (2023.01) |
| *G06N 3/04* | (2023.01) |
| *G06V 10/46* | (2022.01) |

(Continued)

(52) U.S. Cl.
CPC ............... *G06V 20/58* (2022.01); *B60Q 9/00* (2013.01); *G06F 18/214* (2023.01); *G06F 18/217* (2023.01); *G06F 18/2413* (2023.01); *G06N 3/04* (2013.01); *G06V 10/462* (2022.01); *G06V 10/82* (2022.01); *G06V 20/56* (2022.01); *G06V 20/597* (2022.01)

(58) Field of Classification Search
CPC ...... G06V 20/58; G06V 10/462; G06V 10/82; G06V 20/56; G06V 20/597; B60Q 9/00; G06F 18/214; G06F 18/217; G06F 18/2413; G06F 18/241; G06N 3/04; G06N 3/08

See application file for complete search history.

(56) References Cited

U.S. PATENT DOCUMENTS

| | | | |
|---|---|---|---|
| 10,699,192 B1 * | 6/2020 | Kim .................... | G06F 18/217 |
| 2017/0103269 A1 * | 4/2017 | Heisele ................ | G06V 20/58 |

(Continued)

FOREIGN PATENT DOCUMENTS

GB 2454857 B 6/2010

*Primary Examiner* — Md K Talukder

(74) *Attorney, Agent, or Firm* — NORTON ROSE FULBRIGHT US LLP; Gerard A. Messina

(57) ABSTRACT

A method for training a classifier for image data using learning image data and associated labels, each of the labels including an allocation to one or multiple classes of a predefined classification. In the method, for each data set of learning image data, space-resolved relevance maps are provided, which indicate how relevant which spatial areas of the particular learning image data are for the assessment of the situation shown in the learning image data. From data sets of learning image data and associated relevance maps, learning samples are ascertained; the learning samples are fed to the classifier; and classifier parameters are optimized with the aim that the classifier maps the learning samples to allocations to one or multiple classes which are consistent with the labels of the learning image data from which the learning samples originate.

8 Claims, 5 Drawing Sheets

(51) Int. Cl.
*G06V 10/82* (2022.01)
*G06V 20/56* (2022.01)
*G06V 20/58* (2022.01)
*G06V 20/59* (2022.01)

(56) References Cited

U.S. PATENT DOCUMENTS

2018/0018553 A1* 1/2018 Bach ................... G06V 10/454
2018/0240221 A1* 8/2018 Rijnders ................... G06T 5/10
2021/0125104 A1* 4/2021 Christiansen .......... G06N 20/10
2021/0406587 A1* 12/2021 Mayer ..................... G06N 3/08

* cited by examiner

IMAGE CLASSIFICATION AND ASSOCIATED TRAINING FOR SAFETY-RELEVANT CLASSIFICATION TASKS

CROSS REFERENCE

The present application claims the benefit under 35 U.S.C. § 119 of German Patent Application No. DE 102020208008.9 filed on Jun. 29, 2020, which is expressly incorporated herein by reference in its entirety.

FIELD

The present invention relates to the automatic classification of image data with regard to its content, for example for the at least semi-automated driving of vehicles.

BACKGROUND INFORMATION

Around 90% of the information a human driver needs to drive a vehicle in traffic is visual information. For the at least semi-automated driving of vehicles, it is therefore indispensable to correctly evaluate the content of image data of any modality which are recorded when observing the vehicle surroundings. A classification of the image data according to which traffic-relevant objects are contained therein, such as for example other road users, road markings, obstacles and traffic signs, is of particular importance for the task of driving.

To deal with this complexity, artificial neural networks are used. Such neural networks may, for example, be made up of multiple layers connected one after another, in which the dimensionality of the task is significantly reduced by using convolutional cores and by downsampling. Such neural networks are also characterized in that the data are solidly processed in parallel. Great Britain Patent No. GB 2 454 857 B describes an example of a method in which, using a self-learning neural network, a microscope image is classified according to which objects it contains.

For the safety-related assessment of neural networks and other trainable classifiers, it is important to what extent their behavior is explainable and comprehensible.

SUMMARY

Within the scope of the present invention, a method is provided for training a classifier for image data with the aid of learning image data and associated labels. Besides static images and frames (individual images) from films or image sequences, the term "image data" also includes in particular such films and image sequences. The complete film, or the complete image sequence, contains an additional piece of information regarding the dynamic change in the image content. This dynamic quality is missing from the individual images. The fact that this dynamic quality is important is consistent with the fact that people prefer to perceive moving or flashing image content over static image content.

Each label includes an allocation to one or more classes of a predefined classification. By way of example, the classes may represent objects which are visible in the learning image data. In image data of traffic situations, these objects may in particular be pedestrians, other vehicles, road boundaries, traffic signs and other traffic-relevant objects.

In accordance with an example embodiment of the present invention, space-resolved relevance maps are provided for some or ideally for all data sets of learning image data. These relevance maps indicate how relevant which spatial areas of the particular learning image data are for the assessment of the situation shown in these learning image data. By way of example, a data set of learning image data may be a static image or a frame from a film or from an image sequence. However, a data set of learning image data may also be a film or an image sequence. By way of example, a dynamic change in a particular spatial area in the course of a film or an image sequence may already provide a reason for this spatial area to be classified as particularly relevant.

In the simplest case, the relevance may be indicated in a binary fashion (for instance 0=not relevant, 1=relevant), but also in arbitrary gradings which may express a relative prioritization of spatial areas in the image data relative to one another.

In accordance with an example embodiment of the present invention, learning samples are ascertained from data sets of learning image data and associated relevance maps. In these learning samples, the higher the local relevance according to the relevance map, the more pronounced the information from the learning image data. For this purpose, spatial areas that have a local relevance below a predefined threshold value may, for example, be blanked out, blurred or otherwise garbled in the learning samples.

The learning samples are fed to the classifier. Thereafter, the classifier maps the learning samples to allocations to one or more classes. Parameters which characterize the behavior of the classifier are then optimized with the aim that these allocations are consistent with the labels of the learning image data from which the learning samples have originated.

If, for example, the classifier contains an artificial neural network, ANN, or is an ANN, the trainable parameters may include, for example, weights with which inputs of neurons or other processing units are settled in a weighted manner for activation of the particular neuron, or of the particular processing unit.

The space-resolved relevance map may come from an arbitrary source. By way of example, it may be supplied together with the labels as further additional information to the learning image data. However, the space-resolved relevance map may also be retrieved, for example, from another trained ANN. This means that this further ANN may be specifically trained on the question of which spatial areas of the image data require particular attention in which situation, regardless of what exactly is contained in these spatial areas of the image data.

It has been found that taking the relevance map into account during training makes the behavior of the classifier much more comprehensible and explainable. Analyses of the "heat maps" of those pixels which were significant for an allocation to particular classes (for instance types of objects) have in the past shown that the decision for particular classes was often made on the basis of image pixels which did not even belong to the objects in question. This behavior is at least partially suppressed by taking the relevance map into account.

The effect is particularly pronounced in the case of classifiers which process image data from traffic situations. In this case, usually large solid angles of the surroundings of a vehicle are detected. In any situation, however, usually only the information from a small part of this solid angle is actually relevant for managing the driving task. If this were not the case, a person who may only look in one direction at a time would have no chance of mastering the driving task. By taking the relevance map into account, the tendency that a recognition by the classifier "zeroes in" on image areas away from the actual traffic event is suppressed.

At the same time, the training is also more effective and faster since the classifier no longer has to learn to distinguish what is important from what is unimportant. By way of example, there may be a division of labor between the ANN, which identifies relevant image areas, and the classifier, which subsequently examines these image areas for the objects they contain. Overall, this is easier to train than a monolithic classifier which performs both tasks.

The present invention also relates to a method for classifying image data using a trained classifier. As explained above, besides static images, these image data may also include entire image sequences or films with dynamic additional information.

Within the scope of this method, in accordance with an example embodiment of the present invention, a space-resolved relevance map is provided, which indicates how relevant which spatial areas of the image data are for the assessment of the situation shown in these image data. From the image data and the space-resolved relevance map, a sample is ascertained in which, the higher the local relevance according to the relevance map, the locally more pronounced the information from the image data. This sample is fed to the classifier and is mapped by the classifier to an allocation to one or more classes of a predefined classification.

In a manner analogous to training, areas which have a local relevance below a predefined threshold value may in this case, for example, be blanked out, blurred or otherwise garbled.

Taking account only of image areas previously identified as relevant suppresses the aforementioned tendency to base the classification of image data on objects which are not even part of the currently relevant traffic situation. At the same time, however, it also enables a compression of the data to be transferred within the vehicle. If, for example, multiple cameras are installed in and at the vehicle, then the significantly information-reduced sample may be created close to the particular camera. This sample may then be forwarded over a bus system, which supplies the entire vehicle, to a central classifier, which evaluates the traffic situation as a whole. Less bandwidth is then required for this transfer.

Most of today's vehicles are equipped with a CAN bus or other bus system, to which many other vehicle systems are connected. Such a bus system enables all connected participants to communicate with one another. Compared to the previous harness of dedicated cables between each two participants communicating with one another, this saves considerable cabling effort. However, the price for this is that the connected participants have to share the bandwidth of the bus system. Generally, only one participant at a time is able to send. If the entire vehicle surroundings are observed by a plurality of sensors (such as high-resolution cameras), large amounts of data are generated which may no longer be able to be transferred in full over the bus system. Even a "high-speed" CAN bus only has a maximum bandwidth of 1 Mbit/s, which is already too little for a full-HD video data stream. However, by significantly reducing the amount of information by forming the sample prior to the transfer over the bus system and thus compressing the data in a lossy manner, the bandwidth is sufficient even for transporting the data obtained from multiple cameras and reduced in the same way.

Also when classifying image data using the classifier, in a manner analogous to training the classifier, the space-resolved relevance map for at least one data set of image data may be retrieved from a trained ANN.

The present invention also relates to a method for measuring a space-resolved relevance map for a concrete data set of image data (or learning image data). This space-resolved relevance map may be used, for example, for training a classifier, for forming a sample to be processed by the classifier, or for training an ANN which ascertains space-resolved relevance maps for image data.

In accordance with an example embodiment of the present invention, in this method, the image data are presented to at least one test subject. The test subject is given the task of perceiving the content of the image data which from its point of view is relevant and, once it has done so, making an input. While the image data are being presented, it is observed to which spatial areas of the image data the test subject turns its attention.

In response to the input made by the test subject indicating that it has perceived the relevant content of the image data, spatial areas of these image data to which the test subject has previously turned its attention are recorded. It is thus ascertained which spatial areas of the image data were the basis for the test subject deciding that it has identified the content of the image data.

It may optionally be checked whether the test subject not only believes it has identified the content of the image data, but also has actually identified it correctly. For example, not only may an input be requested to the effect that the test subject has perceived the relevant content of the image data, but it may also be asked what exactly the test subject in its opinion has identified. The answer to this question may be compared with a pre-known label as to which objects are actually contained in the image data. By way of example, when the test subject inputs that it has perceived the relevant content of the image data, the presentation may be ended (for instance the image or film may be blanked out), and multiple object names may be presented, from which the test subject must select those that are correct. The test subject's input indicating that the relevant content has been perceived may then be rejected, for example, if, when asked, the correct object or at least the correct object class (for instance "dog" or "animal" as the class above "husky") is not named.

The local relevance of those areas to which the test subject has turned its attention in the relevance map is increased. This may in particular take place, for example, also in interaction with many test subjects. From the consideration of the image data by each test subject, the information as to which spatial areas of the image data are on average perceived as relevant may be aggregated for example by a voting mechanism.

The spatial areas of the image data to which the test subject turns its attention does not necessarily depend solely on the image data themselves, but may also be influenced by a task assigned to this test subject. In a vehicle, for example, the driver may be busy with the driving task while the passenger is looking for a parking space, a mailbox or a certain business. Therefore, if, for example, a relevance map for the at least semi-automated driving of the vehicle is being measured, a driver rather than a passenger should be used as the test subject.

In one particularly advantageous embodiment of the present invention, the head posture, the eye position and/or the eye movements of the test subject are recorded. The areas to which the test subject turns its attention may then be evaluated based on the head posture, the eye position and/or the eye movements. This is an indicator that may hardly be consciously influenced by the test subject. At the same time, a driver of a vehicle controls his/her selection of what he/she considers important from the traffic situation, usually via head posture (for instance a shoulder check), eye position and/or eye movements. Other movements are restricted as a result of being strapped into the driver's seat.

As an alternative or also in combination with this, in another advantageous embodiment of the present invention, different sub-areas of the image data may successively become visible to the test subject. Those sub-areas of the image data which are visible at the time of the input made by the test subject may then be deemed to be those areas to which the test subject turns its attention. This does not require any special hardware in order to identify exactly where the test subject is looking.

In particular, one and the same data set of image data may for example be presented to multiple test subjects. By way of example, different sequences of sub-areas of the image data which successively become visible may then be presented to these test subjects. This may include changing the order of the sub-areas which successively become visible, and/or presenting to some test subjects sub-areas which are not presented to other test subjects. On average across these test subjects, a representative conclusion is then drawn as to which sub-areas of the image data are relevant, for example, for the assessment of traffic situations.

The space-resolved relevance map and an ANN which generates such relevance maps may also be used to check whether a vehicle driver or machine operator is currently turning his/her attention to those things that are presently important in terms of safety.

Therefore, the present invention also relates to a method for observing and/or controlling the attention of a vehicle driver or machine operator. In accordance with an example embodiment of the present invention, in this method, image data of the situation in which the driven vehicle or the operated machine is located are detected by at least one sensor. For these image data, a space-resolved relevance map is retrieved from a trained artificial neural network, ANN. This space-resolved relevance map indicates how relevant which areas of the image data are for the assessment of the situation shown in these image data.

Based on this relevance map, a piece of information and/or a warning is output to the vehicle driver or machine operator. By way of example, regardless of his/her present actual behavior, the vehicle driver or machine operator may be informed at all times about which aspects of his/her present situation are presently particular important from a safety-related point of view. If it should be found, when comparing the actual behavior of the vehicle driver or machine operator, that he/she is turning his/her attention to something other than the presently important aspects, he/she may be informed of this by way of a warning.

Behind all this is the consideration that, for a human driver, one of the greatest challenges when learning to drive is that of separating what is important from what is unimportant in the flood of information of the traffic situation. Again and again, there are situations in which the student driver devotes his/her attention entirely to one aspect and the driving instructor has to point out that something else is actually more important.

In addition, in inner cities for example, advertising in shops or at the curbside may attract a lot of attention. The advertising is often designed in such a way that certain "hooks," such as a favorable price, are placed in the foreground and may be read even from a passing vehicle. However, the price is then marked with an asterisk indicating conditions, and any attempt to read these conditions written in small print may take a lot of attention away from the traffic situation.

By way of example, an overlay of the situation may be presented to the vehicle driver or machine operator with an indication of at least one spatial area of the image data, the local relevance of which exceeds a predefined threshold value according to the relevance map. For this purpose, the area of the situation that is presently particularly relevant may be highlighted for example in a head-up display on a windshield or in data glasses worn by the vehicle driver or machine operator, through the insertion of a border or a similar indication.

In another particularly advantageous embodiment of the present invention, the head posture, the eye position and/or the eye movements of the vehicle driver or machine operator are recorded. The head posture, the eye position and/or the eye movements are used to evaluate which part of the situation the vehicle driver or machine operator is predominantly observing.

It is checked, to what extent this part of the situation is consistent with at least one spatial area of the image data, the local relevance of which exceeds a predefined threshold according to the relevance map. In response to establishing that the part of the situation predominantly being observed is not consistent with the spatial area of the image data identified as particularly relevant, a visual, acoustic and/or haptic warning device perceptible to the vehicle driver or machine operator is activated.

Besides the described example of advertising, there are many other situations in which the unfamiliar and unexpected suddenly attracts attention. By way of example, a banknote which is lying on the floor because a colleague has lost it may suddenly come into view when operating a punching machine. The operator then focuses first on this banknote instead of observing the working area of the machine and in particular making sure that both hands are outside the danger zone. This may be identified through comparison with the relevance map, in which specifically this danger zone is rated as particularly relevant.

The methods may in particular be entirely or partially computer implemented. Therefore, the present invention also relates to a computer program containing machine-readable instructions which, when executed on one or multiple computer(s), upgrade the computer(s) to the device described above and/or prompt the computer(s) to carry out one of the methods described above. In this sense, control units for vehicles and embedded systems for technical devices which are also capable of executing machine-readable instructions are also to be regarded as computers.

In addition, the present invention also relates to a machine-readable data medium and/or a download product containing the computer program. A download product is a digital product which is transferrable via a data network, i.e. downloaded by a user of the data network, which may be offered for immediate download in an online shop, for example.

Furthermore, a computer may be equipped with the computer program, with the machine-readable data medium or with the download product.

Further measures which improve the present invention will be presented in greater detail below together with the description of the preferred exemplary embodiments of the present invention and with reference to figures.

DETAILED DESCRIPTION OF EXAMPLE EMBODIMENTS

Figure 1:
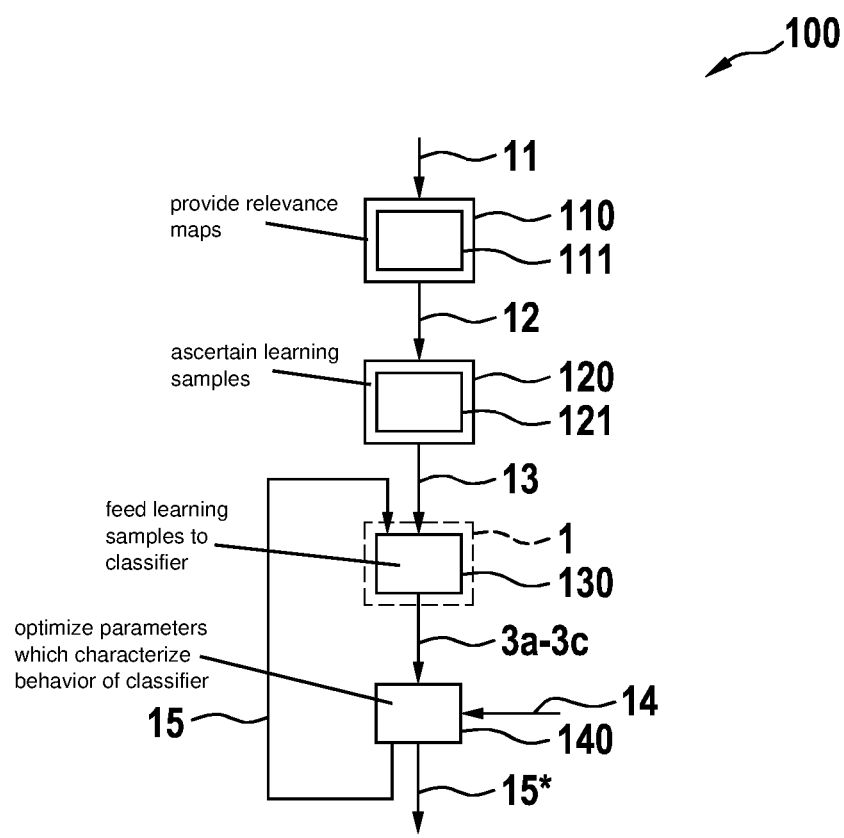
FIG. 1 shows an exemplary embodiment of method 100 for training a classifier 1, in accordance with the present invention.

FIG. 1 is a schematic flowchart of an exemplary embodiment of method 100 for training a classifier 1 for image data 2. In step 110, for learning image data 11, in each case space-resolved relevance maps 12 are provided, those relevance maps 12 according to block 111 may be retrieved, for example, from an appropriately trained ANN. In step 120, from learning image data 11 and associated relevance maps 12, learning samples 13 are ascertained, in which, the higher the local relevance according to relevance map 12, the locally more pronounced the information from learning image data 11. In this case, in particular according to block 121, spatial areas whose local relevance is below a predefined threshold value may be blanked out, blurred or otherwise garbled.

In step 130, learning samples 13 are fed to classifier 1 and are mapped to allocations to one or multiple classes 3a through 3c. In step 140, parameters 15 which characterize the behavior of classifier 1 are optimized with the aim that classes 3a through 3c delivered by classifier 1 are consistent with labels 14 of learning image data 11 from which learning samples 13 originated. This optimization may be continued until an arbitrary abort criterion is met. The fully trained state of parameters 15 is denoted by reference numeral 15*.

Figure 2:
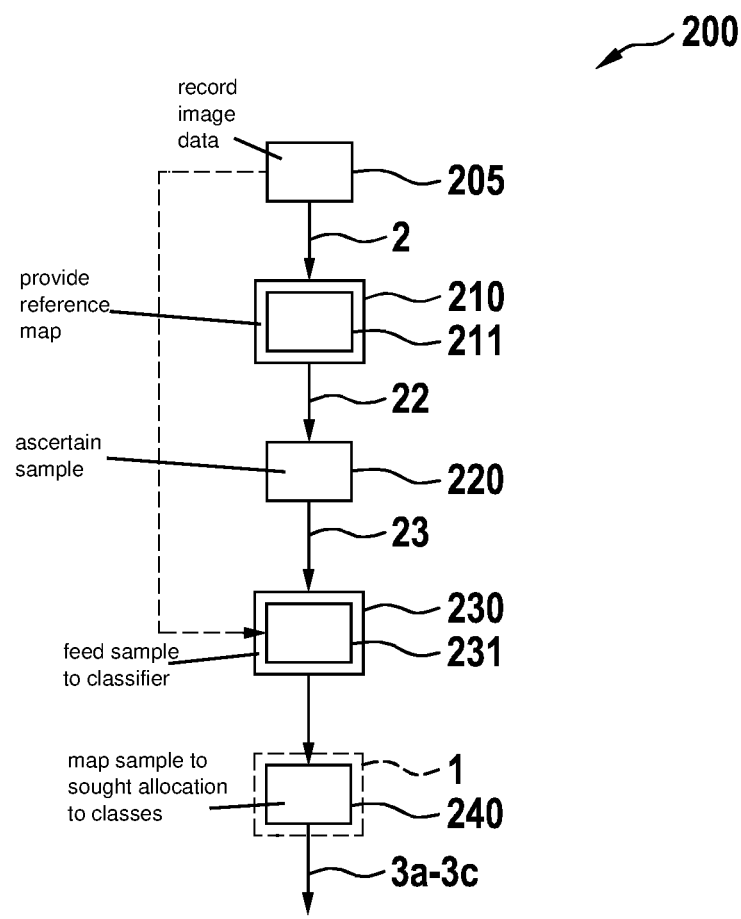
FIG. 2 shows an exemplary embodiment of method 200 for classifying image data 2, in accordance with the present invention.

FIG. 2 is a schematic flowchart of an exemplary embodiment of method 200 for classifying image data 2. In step 205, image data 2 may be recorded optionally by at least one sensor carried by a vehicle. In step 210, for image data 2, a space-resolved reference map 22 is provided, which in particular according to block 211, for example, may be retrieved from an ANN. In step 220, in a manner analogous to step 120, a sample 23 is ascertained, in which, the higher the local relevance according to relevance map 22, the locally more pronounced the information from image data 2.

In step 230, sample 23 is fed to classifier 1, and according to block 231 in particular, for example, only the significantly data-reduced sample 23 compared to image data 2 may be transferred by the sensor via a bus system of the vehicle, but not image data 2 themselves. In step 240, sample 23 is mapped by classifier 1 to the sought allocation to classes 3a through 3c of the predefined classification.

Figure 3:
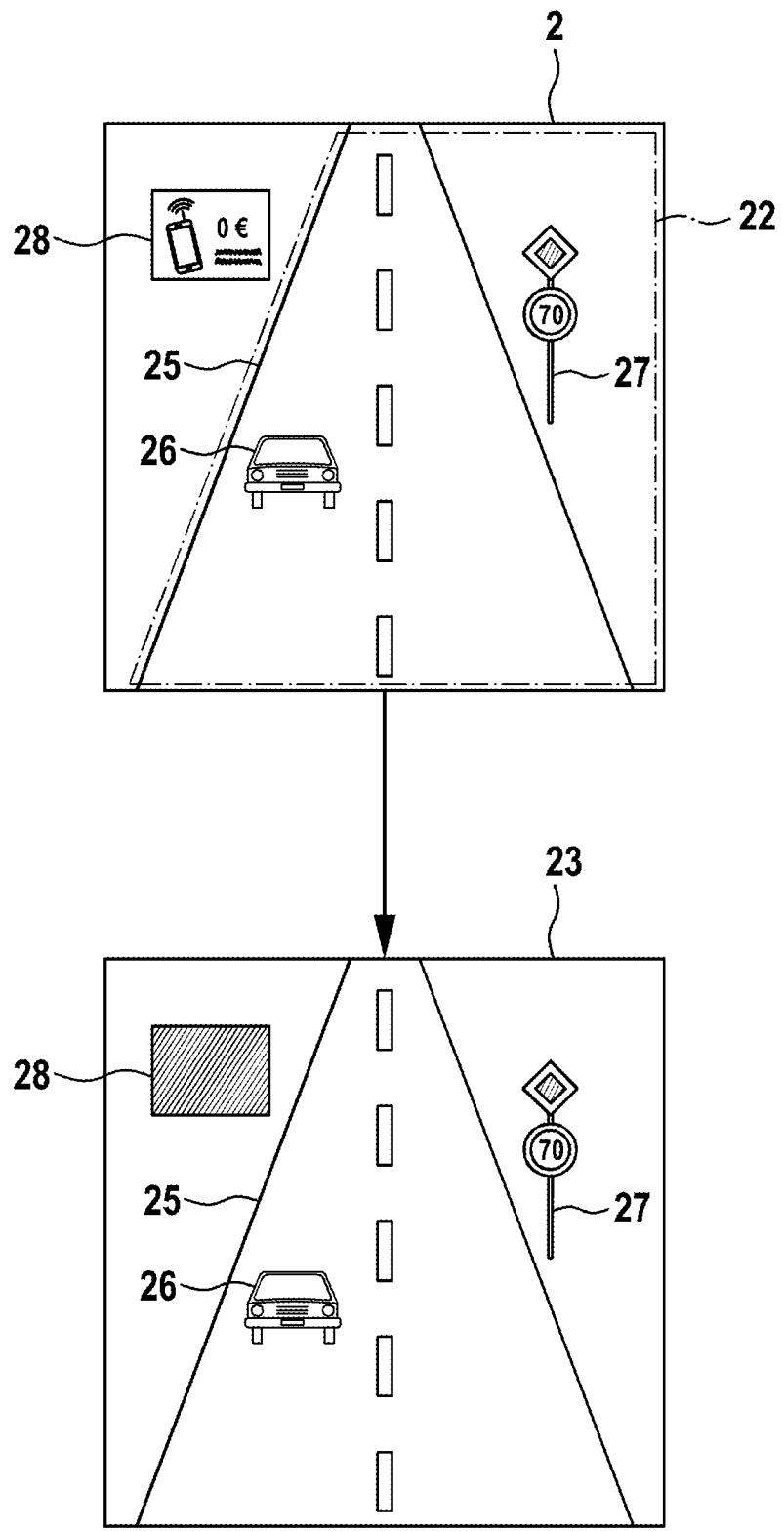
FIG. 3 shows an example of the generation of a sample 23 for classification based on image data 2, in accordance with the present invention.

FIG. 3 shows an example of how image data 2 may be converted into a sample 23. Image data 2, which here are in the form of a static image, show a traffic situation including a road 25, an oncoming vehicle 26 and a traffic sign 27. In addition, a billboard 28 is visible on the left-hand curbside. Relevance map 22 assesses road 25, vehicle 26 and the right-hand curbside, where traffic signs such as sign 27 are located, as relevant. This area is therefore unchanged in sample 23 for the classification, while the details of billboard 28 are blanked out.

Figure 4:
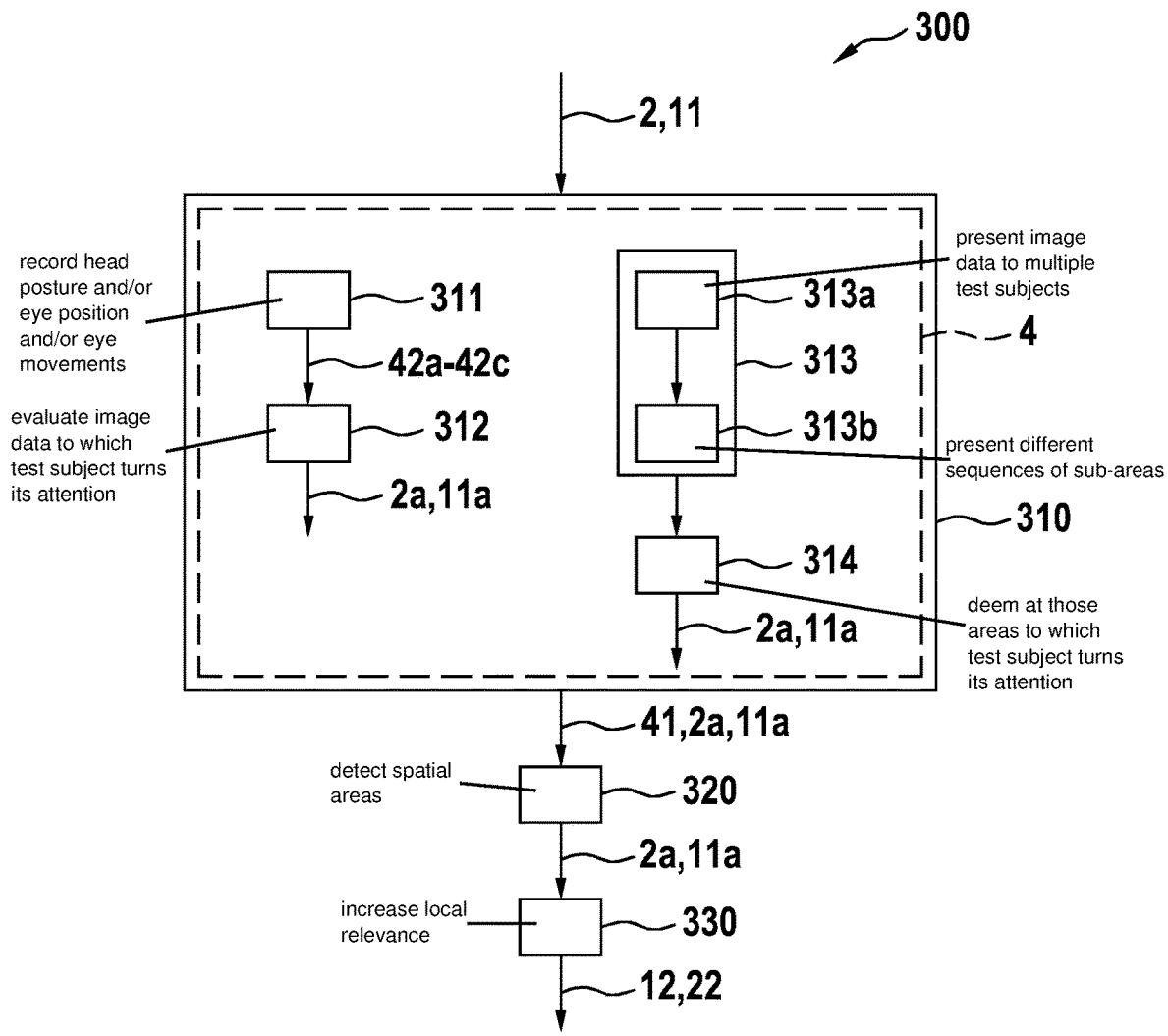
FIG. 4 shows an exemplary embodiment of method 300 for measuring a relevance map 12, 22, in accordance with the present invention.

FIG. 4 is a schematic flowchart of an exemplary embodiment of method 300 for measuring a relevance map 12, 22 for image data 2, 11. In step 310, image data 2, 11 are presented to at least one test subject 4. Meanwhile, it is observed to which spatial areas 2a, 11a of image data 2, 11 test subject 4 turns its attention.

In response to input 41 made by test subject 4 indicating that it has perceived the relevant content of image data 2, 11, spatial areas 2a, 11a to which test subject 4 has previously turned its attention are detected in step 320. In step 330, the local relevance of these areas 2a, 11a in relevance map 12, 22 is increased.

Box 310 shows, by way of example, two possible ways in which the turning of attention to areas 2a, 11a may be established. These possibilities may be used individually or also in combination.

According to block 311, head posture 42a, eye position 42b and/or eye movements 42c of test subject 4 may be recorded. According to block 312, areas 2a, 11a of image data 2, 11 to which test subject 4 turns its attention may then be evaluated based on head posture 42a, eye position 42b and/or eye movements 42c.

According to block 313, different sub-areas of image data 2, 11 may be successively made visible to test subject 4 until test subject 4 recognizes image data 2, 11 and makes input 41. In particular, according to block 313a, one and the same data set of image data 2, 11 may be presented to multiple test subjects 4. Different sequences of sub-areas of image data 2, 11 which successively become visible may be presented to these test subjects 4. (Block 313b).

According to block 314, those sub-areas of image data 2, 11 which are visible at the time of input 41 made by test subject 4 may be deemed to be those areas 2a, 11a to which test subject 4 turns its attention.

In step 330, the local relevance of ascertained areas 2a, 11a in relevance map 12, 22 is increased, it being possible in particular to use, for example, a voting mechanism across many test subjects 4.

Figure 5:
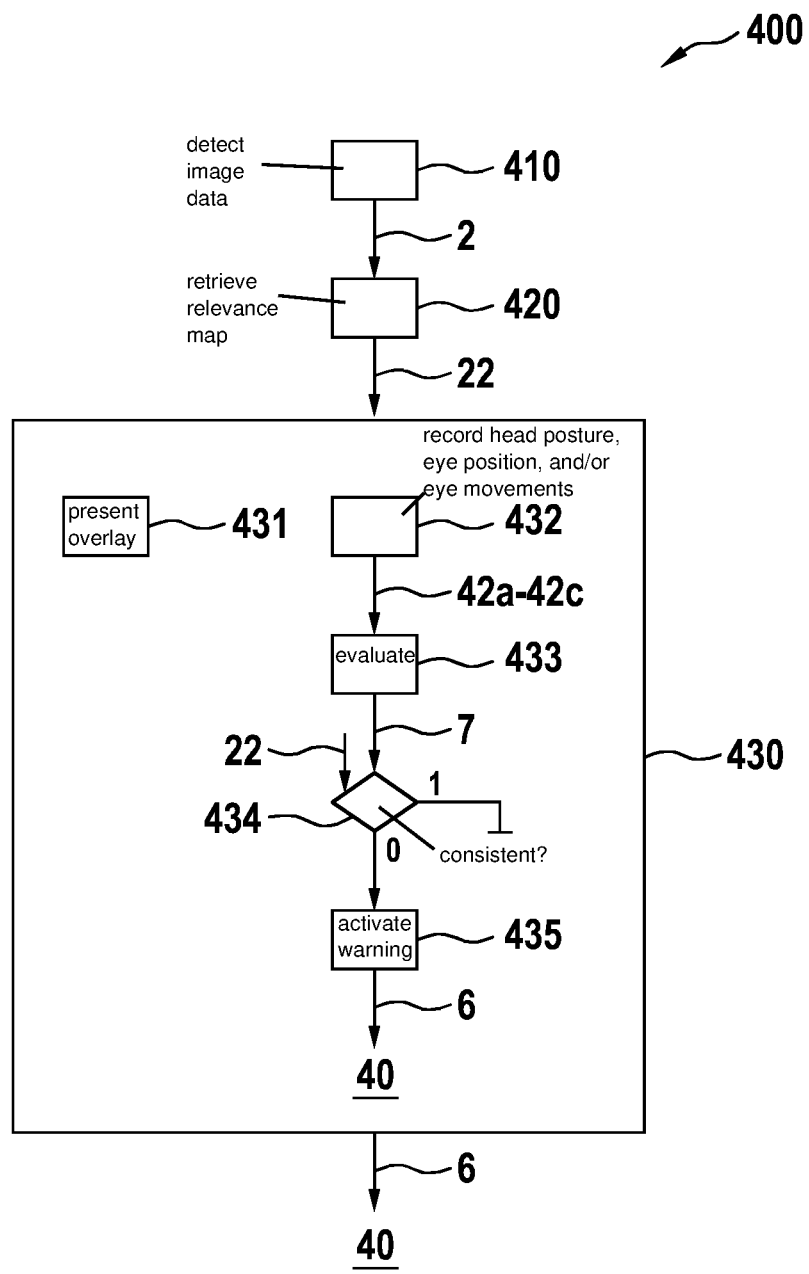
FIG. 5 shows an exemplary embodiment of method 400 for observing and/or controlling the attention of a vehicle driver or machine operator 40, in accordance with the present invention.

FIG. 5 is a schematic flowchart of an exemplary embodiment of method 400 for observing and/or controlling the attention of a vehicle driver or machine operator 40. In step 410, image data 2 of the situation, in which the driven vehicle or the operated machine is located, are detected by at least one sensor. In step 420, for these image data 2, a space-resolved relevance map 22 is retrieved from a trained artificial neural network, ANN. In step 430, based on this relevance map 22, a piece of information and/or a warning 6 is output to the vehicle driver or machine operator 40.

Box 430 shows two possible ways in which the piece of information and/or warning 6 may be generated. These possibilities may be used individually or also in combination.

According to block 431, an overlay of the situation may be presented to the vehicle driver or machine operator 40 with an indication of at least one image area, the local relevance of which exceeds a predefined threshold value according to the relevance map.

According to block 432, head posture 42a, eye position 42b and/or eye movements 42c of vehicle driver or machine operator 40 may be recorded. In block 433, these may be used to evaluate which part 7 of the situation vehicle driver or machine operator 40 is predominantly observing. In block 434, it may be checked to what extent this part 7 of the situation is consistent with at least one spatial area of the image data, the local relevance of which exceeds a predefined threshold value according to relevance map 22. If part 7 of the situation is not consistent with the aforementioned spatial area of the image data (logical value 0), a visual, acoustic and/or haptic warning device perceptible to vehicle driver or machine operator 40 may be activated.

What is claimed is:

1. A method for training an image classifier, the method comprising the following steps:
   for each of a plurality of learning images:
      obtaining a respective space-resolved relevance map, wherein an information density of image information included over an entirety of the respective obtained learning image is a single first information density, and the obtained respective space-resolved relevance map indicated different respective relevancies of different spatial areas of the respective image data;
      based on the obtained respective space-resolved relevance maps, generating a respective modified image by modifying the obtained respective image, the modification being performed by, for each of one or more areas of the respective image, reducing the information density of the respective area to be at a respective other information density that is lower than the first information density, so that different areas of the respective modified image have different information densities than one another, the respective modified image being a respective classifier input sample;
      feeding an entirety of the respective classifier input sample to the classifier;
      executing the classifier by which the classifier processes the respective classifier input sample as a whole, and not the respective learning image, to identify one or more of predefined classes of objects contained in the respective learning image; and
      performing a comparison to determine how consistent the one or more identified classes which the classifier has identified for the respective classifier input sample are with one or more of the predefined classes with which the respective learning image has been labeled; and
   based on the consistency determinations, optimizing one or parameters of the classifier to increase a consistency at which the classifier identifies the classes with the classes with which the learning images are labeled.

2. The method as recited in claim 1, wherein the reducing of the information density of the respective area is performed by setting all pixels of the respective area:
   to be at a same pixel value so that the area becomes a blanked out region of the image; or
   to be a blurred or garbled region of the image.

3. A method for classifying an image using a trained classifier, the method comprising the following steps:
   obtaining the image including image information, wherein an information density of the image information over an entirety of the image is a single first information density;
   obtaining a space-resolved relevance map that indicates different respective relevancies of different spatial areas of the image;
   based on the obtained space-resolved relevance map, generating a modified image by modifying the obtained image, the modification being performed by, for each of one or more areas of the image, reducing the information density of the respective area to be at a respective other information density that is lower than the first information density, so that different areas of the modified image have different information densities than one another, the modified image being a classifier input sample;
   feeding the classifier an entirety of the input sample to the classifier; and
   executing the classifier by which the classifier processes the sample as a whole, and not the obtained image, to identify one or more predefined classes of objects contained in the obtained image.

4. The method as recited in claim 3, wherein the image is obtained by a recordation by at least one sensor carried by a vehicle, and the sample, but not the recorded image, is transferred to the classifier via a bus system of the vehicle, which is also used by other on-board systems of the vehicle.

5. The method as recited in claim 1, wherein the respective space-resolved relevance map is retrieved from a trained artificial neural network (ANN).

6. The method as recited in claim 3, wherein the obtainment of the space-resolved relevance map is from a trained artificial neural network (ANN).

7. A non-transitory machine-readable data medium on which is stored a computer program that is executable by one or more computers and that, when executed by the one or more computers, causes the one or more computers to perform a method for training an image classifier, the method including the following steps:
   for each of a plurality of learning images:
      obtaining a respective space-resolved relevance map, wherein an information density of image information included over an entirety of the respective obtained learning image is a single first information density, and the obtained respective space-resolved relevance map indicated different respective relevancies of different spatial areas of the respective image;
      based on the obtained respective space-resolved relevance maps, generating a respective modified image by modifying the obtained respective image, the modification being performed by, for each of one or more areas of the respective image, reducing information density of the respective area to be at a respective other information density that is lower than the first information density, so that different areas of the respective modified image have different information densities than one another, the respective modified image being a respective classifier input sample;
      feeding an entirety of the respective classifier input sample to the classifier;
      executing the classifier by which the classifier processes the respective classifier input sample as a whole, and not the respective learning image, to identify one or more of predefined classes of objects contained in the respective learning image; and
      performing a comparison to determine how consistent the one or more identified classes which the classifier has identified for the respective classifier input sample are with one or more of the predefined classes with which the respective learning image has been labeled; and
   based on the consistency determinations, optimizing one or parameters of the classifier to increase a consistency at which the classifier identifies the classes with the classes with which the learning images are labeled.

8. A computer configured to train an image classifier, the computer being configured to perform a method, the method comprising:
   for each of a plurality of learning images:

obtaining a respective space-resolved relevance map, wherein an information density of image information included over an entirety of the respective obtained learning image is a single first information density, and the obtained respective space-resolved relevance map indicated different respective relevancies of different spatial areas of the respective image;

based on the obtained respective space-resolved relevance maps, generating a respective modified image by modifying the obtained respective image, the modification being performed by, for each of one or more areas of the respective image, reducing the information density of the respective area to be at a respective other information density that is lower than the first information density, so that different areas of the respective modified image have different information densities than one another, the respective modified image being a respective classifier input sample;

feeding an entirety of the respective classifier input sample to the classifier;

executing the classifier by which the classifier processes the respective classifier input sample as a whole, and not the respective learning image, to identify one or more of predefined classes of objects contained in the respective learning image; and performing a comparison to determine how consistent the one or more identified classes which the classifier has identified for the respective classifier input sample are with one or more of the predefined classes with which the respective learning image has been labeled; and based on the consistency determinations, optimizing one or parameters of the classifier to increase a consistency at which the classifier identifies the classes with the classes with which the learning images are labeled.

* * * * *